(12) United States Patent
Kaji et al.

(10) Patent No.: US 11,586,639 B2
(45) Date of Patent: Feb. 21, 2023

(54) INFORMATION COMPUTING APPARATUS, INFORMATION COMPUTING METHOD, AND NON-TRANSITORY COMPUTER READABLE STORAGE MEDIUM

(71) Applicant: Yahoo Japan Corporation, Tokyo (JP)

(72) Inventors: Nobuhiko Kaji, Tokyo (JP); Yohei Iseki, Tokyo (JP); Keigo Suenaga, Tokyo (JP); Shogo Suzuki, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 22 days.

(21) Appl. No.: 17/196,530

(22) Filed: Mar. 9, 2021

(65) Prior Publication Data

US 2022/0019582 A1 Jan. 20, 2022

(30) Foreign Application Priority Data

May 12, 2020 (JP) .............................. JP2020-084044

(51) Int. Cl.
*G06Q 30/02* (2012.01)
*G06F 16/2458* (2019.01)
*G06Q 30/0242* (2023.01)

(52) U.S. Cl.
CPC ..... *G06F 16/2471* (2019.01); *G06Q 30/0246* (2013.01)

(58) Field of Classification Search
CPC ............ G06F 16/2471; G06F 16/9035; G06Q 30/0246
See application file for complete search history.

(56) References Cited

U.S. PATENT DOCUMENTS

| | | | | |
|---|---|---|---|---|
| 11,016,964 | B1* | 5/2021 | Hinegardner | G06F 16/2428 |
| 2009/0132340 | A1* | 5/2009 | Demir | G06Q 30/02 |
| | | | | 705/7.29 |
| 2012/0179705 | A1* | 7/2012 | Kumaran | G06F 16/3325 |
| | | | | 707/E17.062 |
| 2013/0332438 | A1* | 12/2013 | Li | G06F 16/24575 |
| | | | | 707/706 |

FOREIGN PATENT DOCUMENTS

| | | |
|---|---|---|
| JP | 2019159883 A | 9/2019 |
| JP | 2020042333 A | 3/2020 |

OTHER PUBLICATIONS

The Art of SEO by Enge (Year: 2012).*
University of Chicago, Consumer Heterogeneity and Paid Search Effectiveness: A Large Scale Field Experiment, Chris Nosko pp. 1-32 (Year: 2014).*
Office Action dated Aug. 17, 2021 in corresponding JP Patent Application No. 2020-084044, 8 pages.

* cited by examiner

*Primary Examiner* — Breffni Baggot
(74) *Attorney, Agent, or Firm* — Procopio, Cory, Hargreaves & Savitch LLP

(57) ABSTRACT

An information processing device according to the present application includes an acquisition unit, a selection unit, and a search unit. The acquisition unit acquires a search query input by a user. The selection unit selects a type of target information to be searched on the basis of the search query acquired by the acquisition unit. The search unit searches for information corresponding to the search query from the type of target information to be searched selected by the selection unit.

13 Claims, 6 Drawing Sheets

INFORMATION COMPUTING APPARATUS, INFORMATION COMPUTING METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2020-084044 filed in Japan on May 12, 2020.

BACKGROUND OF THE INVENTION

1. Field of the Invention

The present invention relates to an information processing device, an information processing method, and a non-transitory computer readable storage medium.

2. Description of the Related Art

Conventionally, a technology of providing information on a keyword input by a user has been known (see JP 2019-159883 A).

However, in the conventional technology described above, it may be impossible to provide information desired by the user. For example, a method of searching for a transaction target corresponding to a search query input by a user in an electronic mall can be considered. However, in such processing, search results based on information having little relevance to the search query among various information associated with the transaction target may be provided, such as a transaction target of a name corresponding to the search query as well as a product sold by a seller corresponding to the search query, a transaction target of an attribute corresponding to the search query, or the like.

SUMMARY OF THE INVENTION

It is an object of the present invention to at least partially solve the problems in the conventional technology.

According to an aspect of an embodiment of the present application, an information processing device includes an acquisition unit that acquires a search query input by a user, a selection unit that selects a type of target information to be searched on a basis of the search query acquired by the acquisition unit, and a search unit that searches for information corresponding to the search query from the type of target information to be searched selected by the selection unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
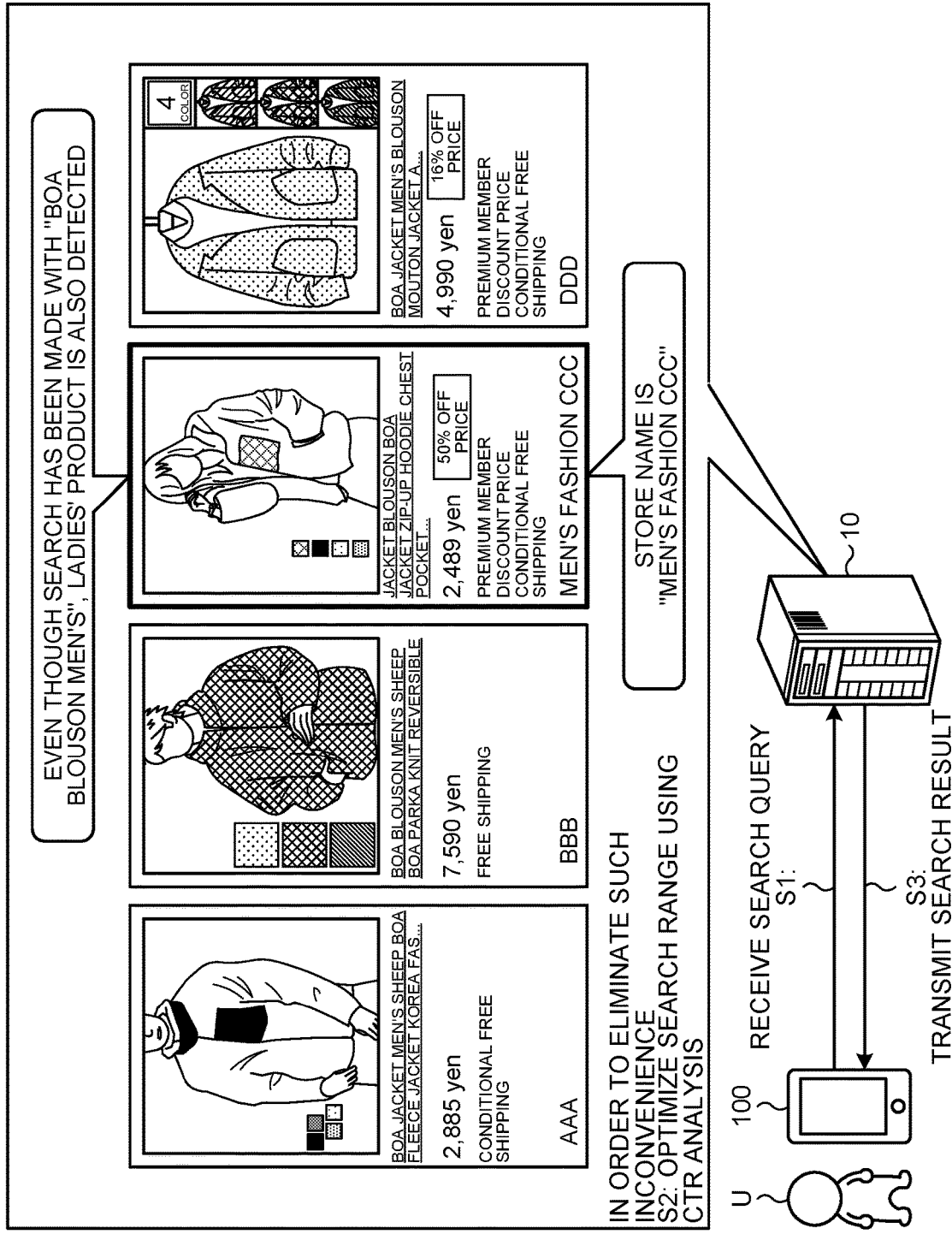
FIG. 1 is a diagram illustrating an example of an information processing system according to an embodiment.

Hereinafter, a mode (hereinafter referred to as "an embodiment") for carrying out an information processing device, an information processing method, and a non-transitory computer readable storage medium according to the present application will be described in detail with reference to the drawings. Note that the information processing device, the information processing method, and the non-transitory computer readable storage medium according to the present application are not limited by this embodiment. In addition, in each of the following embodiments, the same portions will be denoted by the same reference numerals, and an overlapping description thereof will be omitted.

EMBODIMENT

1. Configuration of Information Processing System

First, a configuration of an information processing system 1 having a terminal device 100 or a search device 10, which is an example of an information processing device, will be described with reference to FIG. 1. FIG. 1 is a diagram illustrating an example of an information processing system 1 according to an embodiment. As illustrated in FIG. 1, the information processing system 1 includes a search device 10 and a terminal device 100. Note that the information processing system 1 includes a plurality of terminal devices 100. Here, the search device 10 and the terminal device 100 are communicably connected to each other via a network N (see, for example, FIG. 4) in a wired or wireless manner.

The search device 10 is an information processing device that performs a search on the network according to a search query (keyword or the like) input by a user as a search engine, and is realized by, for example, a server device or a cloud system. For example, the search device 10 detects a website, a social networking service (SNS) site, or an electronic commerce (EC) site corresponding to the search query input by the user via the network. Alternatively, the search device 10 detects a web page, a post, or the like corresponding to the search query input by the user on these sites. Alternatively, the search device 10 detects a product or the like corresponding to the search query input by the user in an electronic mall (online mall), an auction site, an interpersonal transaction site, or the like. Alternatively, the search device 10 may detect a file, an application program (application), or the like corresponding to the search query input by the user. Here, the search device 10 receives the search query input by the user to the terminal device 100, and transmits search results to the terminal device 100 as a response of the search query.

The terminal device 100 is a smart device such as a smartphone or tablet, and is a mobile terminal device capable of communicating with an arbitrary server device via a wireless communication network such as $3^{rd}$ generation (3G) or long term evolution (LTE). In the example of FIG. 1, the terminal device 100 is used by a user U who is an example of the user. In addition, the terminal device 100 has a screen which is a screen of a liquid crystal display or the like and has a function of a touch panel, and receives various operations for display data such as a content, such as a tap operation, a slide operation, and a scroll operation by a finger, a stylus, or the like, from the user. In the following description, an operation performed on a region where the content is displayed in the screen may be described as an operation for the content. Note that the terminal device 100 may be not only the smart device but also an information processing device such as a desktop personal computer (PC) or a notebook PC. That is, the terminal device is an information processing device to which the search query can be input and which can display the search result.

However, in the conventional technology, for example, a search query regarding a product input for a product search might be hit in a store name rather than the product, such that an irrelevant product handled at the store might be displayed as a search result. For example, despite a "wooden toy" input as the search query, a "product other than a wooden toy" handled in a store including the "wooden toy" in a part of a store name might be displayed as a search result. Therefore, the search device 10 according to the present embodiment optimizes a search range on the basis of a dispersion tendency of click through rate (CTR) of the search results. The CTR is an index indicating a ratio of the number of clicks to the number of impressions.

The CTR can be expressed by the following equation:

CTR (click through rate) [%]=number of clicks number of impressions (×100).

For example, in a case where the number of impressions is 1000 and the number of clicks is 10, the CTR is 1%. Note that the CTR is only an example. Actually, a conversion rate (CVR) may be used instead of the CTR. The CVR is an index indicating a ratio of the number of conversions (achievements on a site) to the number of visits to a website or the number of page views, and is, for example, a value obtained by dividing the number of purchases made at clicked pages by the number of clicks. In addition, since the CTR is a value determined on the basis of the number of clicks, the number of clicks may be used instead of the CTR.

2. Processing Executed by Information Processing System

In the information processing system 1, the search device 10 and the terminal device 100 execute the following provision processing. In the following description, an example of processing in which proposed data is provided to the user by processing executed by the search device 10 will be described, but a part or all of provision processing to be described below may be realized by the terminal device 100.

For example, the search device 10 receives a search query (keyword or the like) input by the user to the terminal device 100 from the terminal device 100 (Step S1).

At this time, in the conventional technology, for example, in a product search in an electronic mall (online mall), a product (transaction target) that does not correspond to the keyword input as the search query might be returned as a search result. For example, even though a search has been made by inputting a "boa blouson men's" as the search query, a ladies' product was sometimes detected. The reason is that even though the keyword input as the search query is a product name, a store related to the keyword was detected as the search result and a product handled at the store was returned as the search result. Thus, in the conventional technology, in a case where some ladies' "boa blousons" are handed in a store including "men's" in a part of a store name, there is a possibility that the ladies' "boa blousons" will be returned as a search result.

Therefore, the search device 10 optimizes the search range using a CTR analysis in order to eliminate such inconvenience (Step S2).

Here, the search device 10 determines whether or not the store name is included in the search query (determination of inclusion of the store name) using the CTR analysis. As a method of this determination of the inclusion of the store name, several methods can be considered.

For example, as a first method, the search device 10 determines whether or not the store name is included in the search query on a click basis.

Specifically, the search device 10 determines whether or not a CTR of a site regarding a specific store is prominent among search results corresponding to the search query. The site regarding the specific store is a site of the specific store itself, a site of products provided by the specific store, or the like. For example, the search device 10 determines that the CTR is prominent in a case where the CTR is maximum or higher (within top three, or the like) or in a case where the CTR is a predetermined threshold value or more.

In a case where the CTR of the site regarding the specific store is prominent, the search device 10 determines that a name of the specific store (store name) is included in the search query and the user is making a search with the intention of purchasing a product at the specific store. That is, the search device 10 estimates that the user is making a product search using a desired store as a condition, as an intention of the user who has input the search query, on the basis of a search result selected in a case where the user has input the search query.

In addition, in a case where the CTR of the site regarding the specific store is not prominent, that is, in a case where user's clicks are distributed to a plurality of sites (product sites) with different store names and there is no large difference in a CTR between respective sites, the search device 10 determines that the name of the specific store (store name) is not included in the search query and the user is intentionally searching for a product itself regardless of the store.

In addition, as a second method, the search device 10 determines whether or not the store name is included in the search query by natural language processing.

Specifically, the search device 10 confirms an overlapping rate (matching rate) of words between the search query and the store name on the basis of a search history. For example, in a product search, the search device 10 confirms an overlapping rate of words between a search query when the user clicks on a product site and a name of a store (store name) providing the product. In a case where the overlapping rate of the words between the search query and the store name is high (in a case where the overlapping rate is a predetermined threshold value or more), the search device 10 determines that the store name is included in the search query.

Note that the overlapping rate of the words between the search query and the store name may be obtained by a distributed expression (for example, a vector expression method such as Word2vec). In addition, an N-gram language model or the like may be used. Machine learning is used for unique expression recognition.

The machine learning is, for example, deep learning or the like using a deep neural network (DNN). In addition, data mining or other machine learning algorithms may be used. The search device 10 learns a model by the various learning methods described above.

Note that any type of model can be adopted as the model. For example, the search device 10 may adopt a support vector machine (SVM) or a deep neural network (DNN) as the model. Here, the DNN may be a convolutional neural network (CNN) or a recurrent neural network (RNN). In addition, the RNN may be a long short-term memory (LSTM) or the like. That is, any form of model can be adopted as the model. In addition, the model may be a model realized by combining a plurality of models with each other, for example, a model in which a CNN and an RNN are combined with each other.

In a case where the search device 10 has determined that the store name is included in the search query, the search device 10 can estimate that a search has been made for the specific store corresponding to the store name (with user's intention for the specific store). For example, the search device 10 includes a page of products provided by the specific store in the search result in a case where the search query has been input.

In a case where the search device 10 has determined that the store name is not included in the search query, the search device 10 can estimate that the search has been made for a product matching the search query rather than the specific store. For example, in a case where the search query has been input, the search device 10 does not include a site in which a word of the search query is included only in the store name, in a search result, and includes a page of a product in which the word of the search query is included in a product name or an attribute, a brand, a catchphrase, or the like, of the product, or the like, in the search result.

Figure 2:
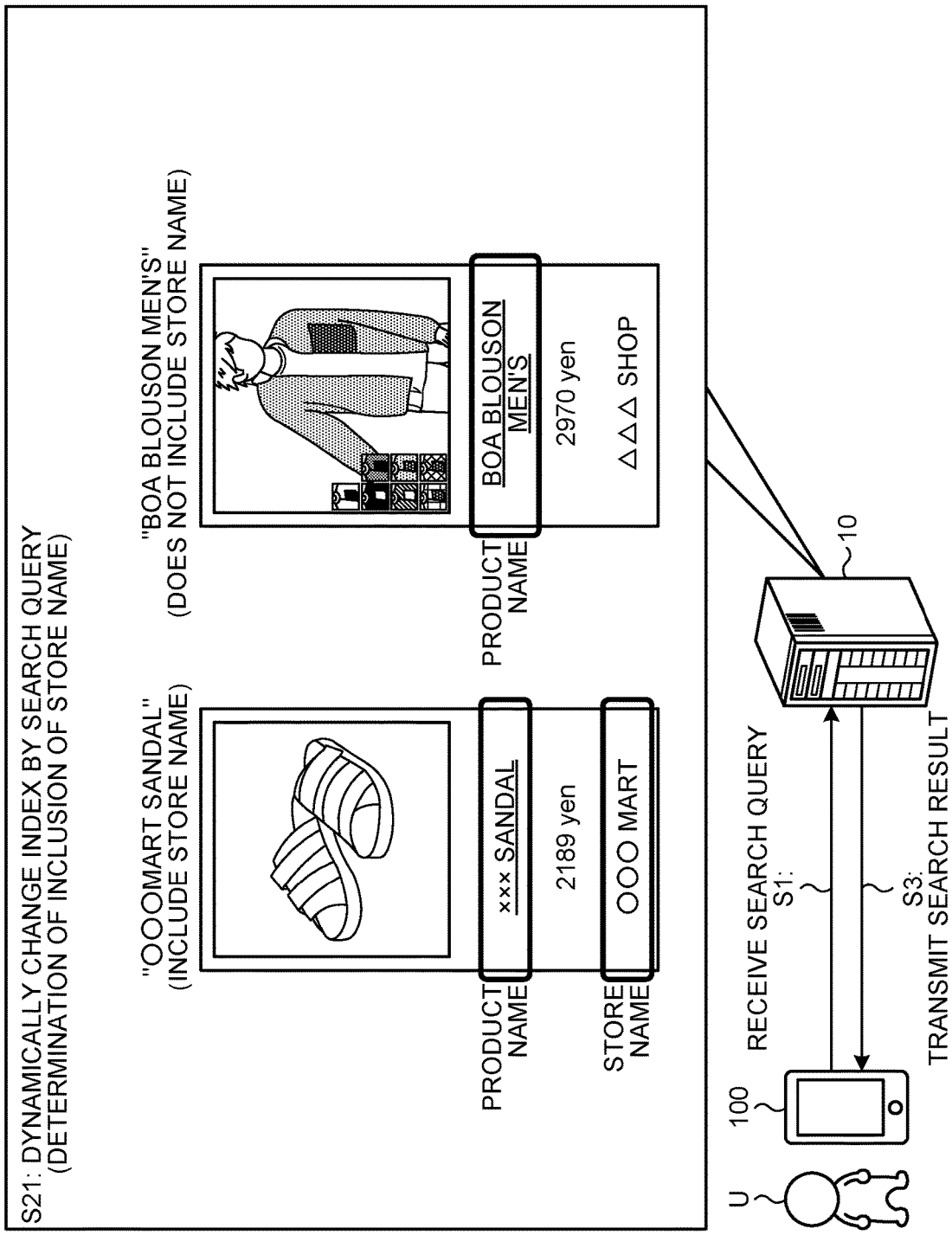
FIG. 2 is a diagram illustrating an example of search range adjustment processing according to the embodiment.

Here, a specific example of search range adjustment processing will be described with reference to FIG. 2. FIG. 2 is a diagram illustrating an example of search range adjustment processing according to the embodiment.

The search device 10 makes a determination of inclusion of the store name for the search query, and dynamically changes an index according to the search query (Step S21).

For example, as illustrated in FIG. 2, in a case where a search query determined to include a store name "000 mart sandal" has been input, a page of products related to various "sandals" provided by a store "000 mart" is provided as a search result.

In addition, as illustrated in FIG. 2, in a case where a search query determined not to include a store name "boa blouson men's" has been input, a page of products related to "boa blouson" of "men's" is provided as a search result regardless of (without depending on) a store. In this case, pages of products other than "boa blouson" of "men's" provided by a store that includes "boa blouson" or "men's" only in the store name are excluded from the search result.

That is, in a case where CTR of the search results using a first range as a search target are distributed for a search query of a specific keyword in the product search, the search device 10 sets a second range different from the first range as a search target.

For example, conventionally, in the product search, a store name table, a product name table, a product attribute table, a brand table, and the like, have been referred to for one search query, but in a case where the CTRs tend to be distributed, the store name table is not referred to as, and only the product name table, the product attribute table, the brand table, and the like, are referred to.

Then, the search device 10 transmits the search result corresponding to the search query to the terminal device 100 (Step S3).

Note that the store name has been described as an example in the above description, but the store name is only an example. The present invention is not limited to being applied to the store name, and may also be applied to, for example, a site name, a manufacturer name, an exhibitor name, a production area name, or the like. In addition, the present invention is not limited to being applied to the store name and the product, and may also be applied to a hotel name and a type of guest room (single, twin or the like), a travel agency name and a travel destination (country name, region name or the like), or the like. In addition, the product may be a service.

3. Configuration of Terminal Device

Figure 3:
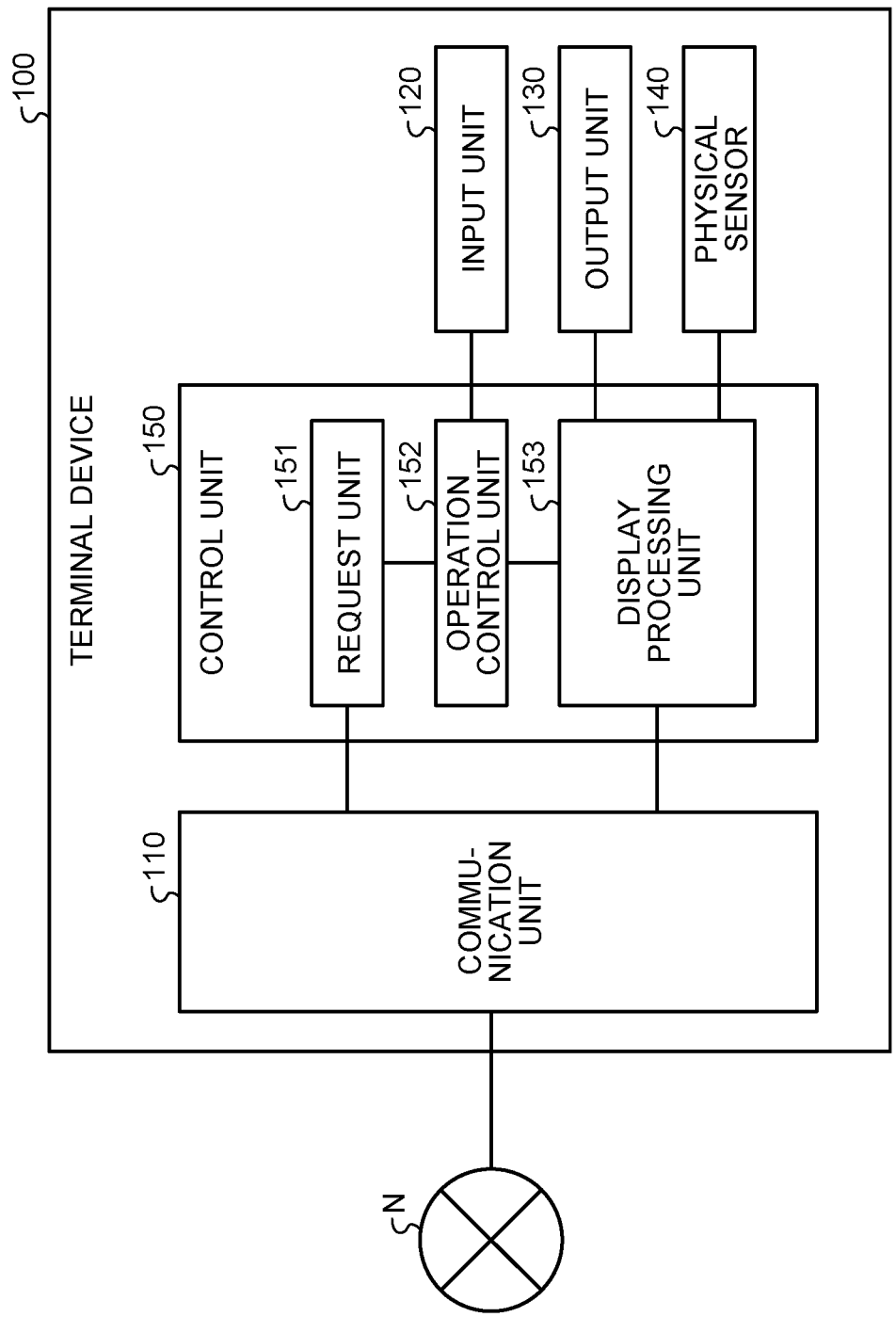
FIG. 3 is a diagram illustrating a configuration example of a terminal device according to the embodiment.

Next, a configuration of the terminal device 100 according to the embodiment will be described with reference to FIG. 3. FIG. 3 is a diagram illustrating a configuration example of the terminal device 100 according to the embodiment. As illustrated in FIG. 3, the terminal device 100 includes a communication unit 110, an input unit 120, an output unit 130, a physical sensor 140, and a control unit 150.

The communication unit 110 is realized by, for example, a network interface card (NIC) or the like. Then, the communication unit 110 is connected to a network N in a wired or wireless manner, and transmits and receives information between the terminal device 100 and the search device 10.

The input unit 120 is an input device that receives various operations from the user. For example, the input unit 120 is realized by a keyboard, a mouse, operation keys, or the like. In addition, the input unit 120 may be a voice input device such as a microphone. Therefore, for example, characters included in voice data can be converted into text data by voice recognition.

The output unit 130 is a display device for displaying various information, that is, a screen. For example, the output unit 130 is realized by a liquid crystal display or the like. Note that in a case where a touch panel is adopted for the terminal device 100, the input unit 120 and the output unit 130 are integrated with each other. In addition, in the following description, the output unit 130 may be described as a screen.

The physical sensor 140 is a sensor that detects various physical information of the terminal device 100, and is, for example, a gyro sensor, an acceleration sensor, an air pressure sensor, a temperature sensor, a volume sensor, a brightness sensor, or the like. Note that the physical sensor 140 may be a sensor that estimates a current position of the terminal device 100 using a positioning system such as a global positioning system (GPS). In addition, the terminal device 100 can position a position of the terminal device 100 using a technology such as pedestrian dead-reckoning (PDR) that uses the above-mentioned acceleration sensor, gyro sensor, air pressure sensor, or the like.

In addition, the physical sensor 140 includes an image sensor. The image sensor is, for example, a charge-coupled device (CCD) image sensor, a complementary metal oxide semiconductor (CMOS) image sensor, or the like. That is, the physical sensor 140 also serves as a camera function of the terminal device 100. Therefore, for example, characters included in image data can be converted into text data by image recognition.

The control unit 150 is realized by, for example, executing various programs stored in a storage device in the search device 10 using a random access memory (RAM) as a work area by a central processing unit (CPU), a micro processing unit (MPU) or the like. For example, these various programs correspond to application programs called web browsers. In addition, the control unit 150 is realized by, for example, an integrated circuit such as an application specific integrated circuit (ASIC), a field programmable gate array (FPGA) or the like.

As illustrated in FIG. 3, the control unit 150 includes a request unit 151, an operation control unit 152, and a display processing unit 153, and realizes or executes functions or actions of information processing to be described below. Note that an internal configuration of the control unit 150 is not limited to a configuration illustrated in FIG. 3, and may be another configuration as long as it is a configuration for performing information processing to be described later. In addition, a connection relationship between respective processing units included in the control unit 150 is not limited to a connection relationship illustrated in FIG. 3, and may be another connection relationship.

In a case where the request unit 151 has received input data regarding a search query from the operation control unit 152, the request unit 151 transmits the search query to the search device 10.

In addition, in a case where the request unit 151 has received the search query from the operation control unit 152, the request unit 151 transmits the search query to the search device 10. At this time, the request unit 151 may transmit a search range adjustment processing request to the search device 10.

The operation control unit 152 executes various controls according to an operation of the user received via the input unit 120. For example, in a case where the user performs various selection operations on the input unit 120, the operation control unit 152 outputs selection operation contents to the display processing unit 153. In addition, the operation control unit 152 outputs contents of an operation of the user such as a scroll operation, a tap operation or the like, received via the input unit 120 to the display processing unit 153.

The display processing unit 153 displays various received data on the output unit 130. For example, the display processing unit 153 executes processing for displaying data regarding the search query or a content. The display processing unit 153 is realized by being executed using a RAM as a work area by, for example, a CPU, an MPU or the like.

4. Configuration of Search Device

Figure 4:
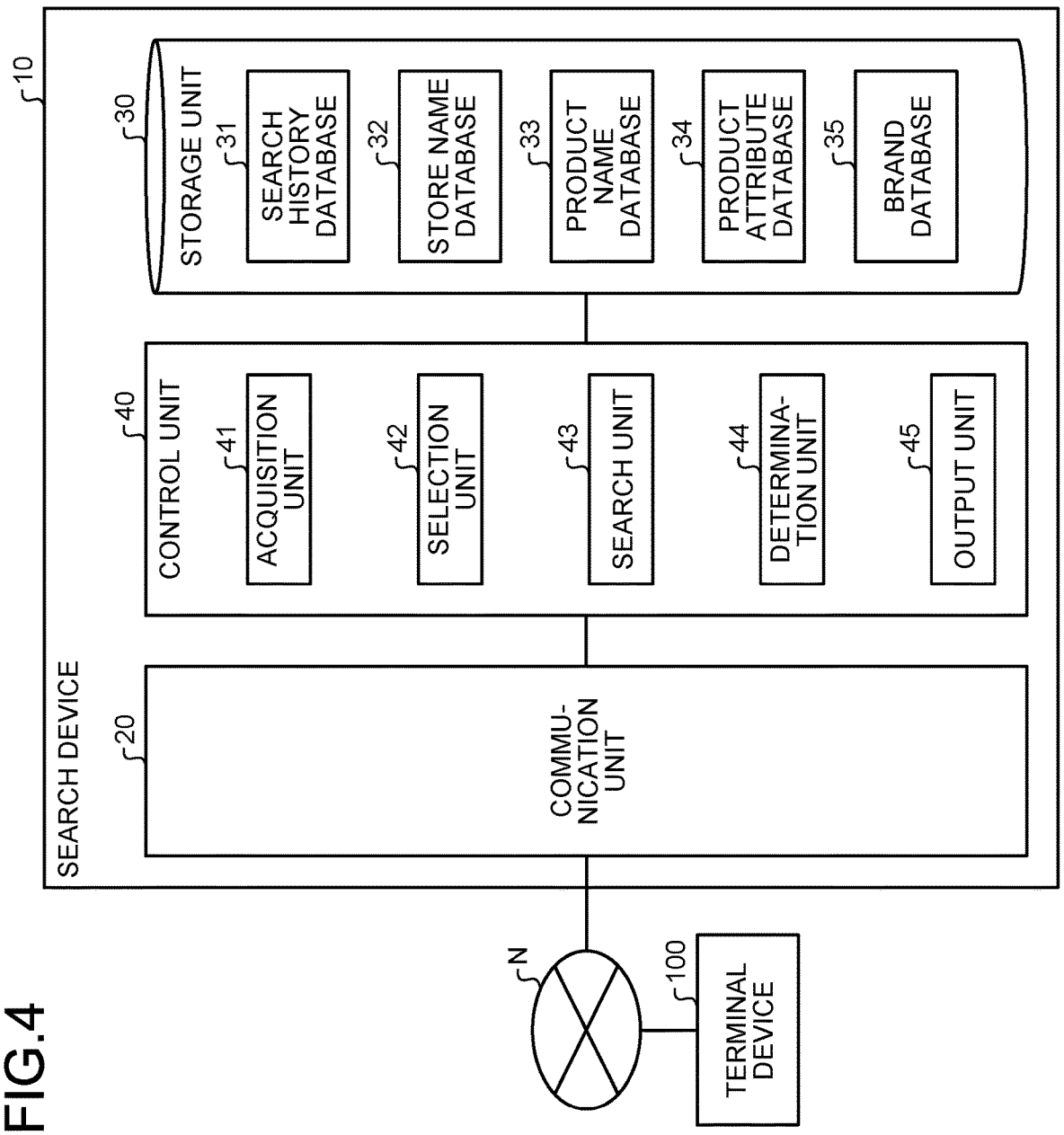
FIG. 4 is a diagram illustrating a configuration example of a search device according to the embodiment.

Next, an example of a functional configuration of the search device 10 according to the embodiment will be described with reference to FIG. 4. FIG. 4 is a diagram illustrating a configuration example of the search device 10 according to the embodiment. As illustrated in FIG. 4, the search device 10 includes a communication unit 20, a storage unit 30, and a control unit 40.

The communication unit 20 is realized by, for example, a network interface card (NIC) or the like. Then, the communication unit 20 is connected to the network N in a wired or wireless manner, and transmits and receives information between the terminal device 100 and the search device 10.

The storage unit 30 is realized by, for example, a semiconductor memory element such as a random access memory (RAM) or a flash memory, or a storage device such as a hard disk drive (HDD), a solid state drive (SSD) or an optical disk. In addition, the storage unit 30 includes a search history database 31, a store name database 32, a product name database 33, a product attribute database 34, and a brand database 35.

The search history database 31 stores a search history (log). For example, the search history database 31 stores search queries received from the terminal device 100, addresses of sites selected by the user among the search results, and the like.

The store name database 32 stores store names. For example, the store name database 32 stores store names posted on web pages clicked by the user. The store name is a proper noun indicating a store, and may be an official name or an abbreviation.

The product name database 33 stores product names. For example, the product name database 33 stores product names posted on the web pages clicked by the user. The product name is a general name or the like of a product, and may be a category or the like of the product.

The product attribute database 34 stores product attributes. The product attributes are various attribute information regarding products, such as specifications, manufacturers, producing countries, and the like, of the products.

The brand database 35 stores brands. The brand is a proper noun indicating a specific product, and may be an official name or an abbreviation. The brand is, for example, a name registered as a trademark, a name widely known to a consumer, or the like. Note that the brand database 35 may store catch phrases or the like of products associated with the brands. In addition, the brand database 35 may be a part of the product name database 33.

Note that the storage unit 30 is not limited to the above, and may store various information depending on purposes.

The control unit 40 is realized by, for example, executing various programs stored in a storage device in the search device 10 using a RAM as a work area by a central processing unit (CPU), a micro processing unit (MPU) or the like. In addition, the control unit 40 is realized by, for example, an integrated circuit such as an application specific integrated circuit (ASIC), a field programmable gate array (FPGA) or the like. As illustrated in FIG. 4, the control unit 40 includes an acquisition unit 41, a selection unit 42, a search unit 43, a determination unit 44, and an output unit 45.

The acquisition unit 41 acquires the search query input by the user from the terminal device 100 via the communication unit 20.

The selection unit 42 selects a type of target information (a name of a product, a name of a store, or the like) to be searched on the basis of the search query acquired by the acquisition unit 41. For example, the selection unit 42 selects the name of the product or that other than the name of the product as the type of target information to be searched. At this time, the selection unit 42 may select the name of the store as that other than the name of the product.

Note that the product is an example of a transaction target and the store is an example of a provider of the transaction target. The transaction target may be various content such as movies, music or the like. In addition, the transaction target may not be actually a transaction target. For example, the selection unit 42 may select a type of data matching the search query among data to be variously searched and various metadata associated with the data.

In addition, the selection unit 42 may select information (a name or the like of the transaction target) of the transaction target itself and associated information such as an attribute of the transaction target as the type of target information to be searched, in an EC site operated by one operator rather than an electronic mall where a plurality of stores are gathered together.

The search unit 43 optimizes a search range using a CTR analysis at the time of performing a search on the basis of the search query acquired by the acquisition unit 41. For example, the search unit 43 searches for information corresponding to the search query from the type of target information to be searched selected by the selection unit 42.

In addition, the search unit 43 makes a determination of inclusion of the store name for the search query, and dynamically changes an index according to the search query.

In addition, in a case where the numbers of clicks of search results using a first range as a search target are distributed for the search query, the search unit 43 sets a second range different from the first range as a search target.

When the search unit 43 has searched for the information corresponding to the search query, the determination unit 44 determines whether the user is intentionally searching for the product or the store on the basis of the number of clicks. Then, the selection unit 42 selects the type of target information to be searched according to a result determined by the determination unit 44.

In addition, if the number of clicks is prominent on a site regarding the store, the determination unit 44 determines that the user is intentionally searching for the store.

In addition, if the numbers of clicks are distributed to a plurality of sites regarding products whose stores are different from each other, the determination unit 44 determines that the user is intentionally searching for the product.

In addition, the determination unit 44 determines that the user is intentionally searching for the store if an overlapping rate of words between the search query and a name of the store is a predetermined threshold value or more, on the basis of the search history.

In addition, if the determination unit 44 has determined that the user is intentionally searching for the store, the determination unit 44 determines that a word matching at least a part of the name of the store is included in the search query.

In addition, if the determination unit 44 has determined that the user is intentionally searching for the product, the determination unit 44 determines that a word matching at least a part of the name of the store is not included in the search query.

In addition, the determination unit 44 determines whether the user is intentionally searching for the product or the store on the basis of the CTR indicating the ratio of the number of clicks to the number of impressions.

The output unit 45 outputs the search result corresponding to the search query to the terminal device 100 via the communication unit 20.

5. Processing Flow of Terminal Device 100

Figure 5:
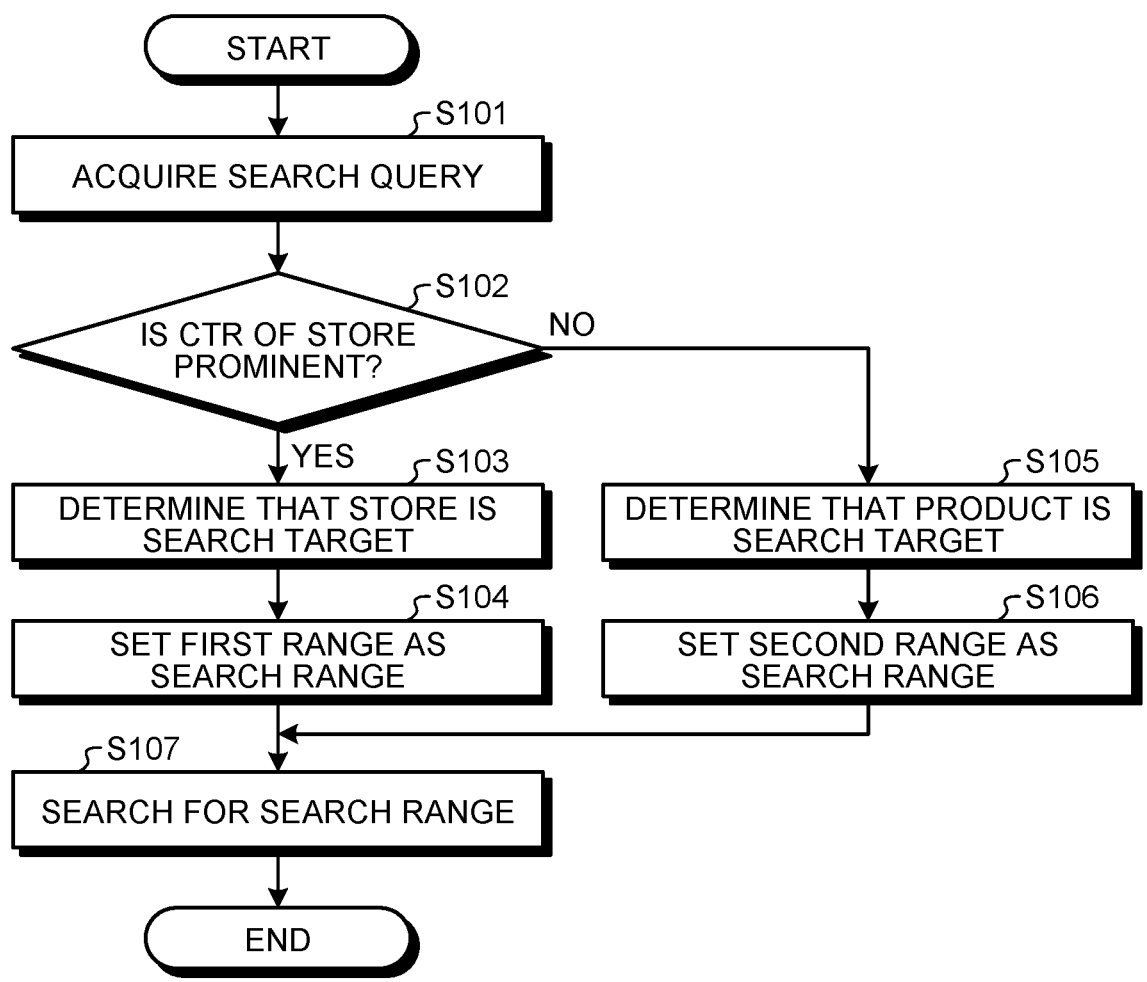
FIG. 5 is a flowchart illustrating an example of a flow of the search range adjustment processing according to the embodiment.

Next, a procedure of search range adjustment processing executed by the terminal device 100 and the search device 10 that have executed control information will be described with reference to FIG. 5. FIG. 5 is a flowchart illustrating an example of a flow of the search range adjustment processing according to the embodiment.

For example, the search device 10 acquires the search query regarding the product search from the terminal device 100 of the user or the search device 10 via the network N (Step S101).

Then, the search device 10 analyzes a CTR of search results based on the acquired search query on the basis of the search history, and determines whether or not a CTR of a site regarding a specific store is prominent (Step S102).

For example, in a case where an overlapping rate (matching rate) between a word included in the search query and a word of a store name included in a clicked product site among product sites displayed as the search result is high (is a predetermined threshold value or more), the search device 10 determines that a word matching at least a part of a name of the specific store (store name) is included in the search query and the CTR of the site regarding the specific store is prominent.

In a case where the search device 10 has determined that the CTR of the site regarding the specific store is prominent (Step S102: Yes), the search device 10 determines that the user is intentionally searching for the specific store (Step S103).

In this case, the search device 10 changes an index of the search and sets a first range that includes the store name as a search target for the search query (Step S104). Note that the first range may be a normal search range without limitation.

On the contrary, in a case where the search device 10 has determined that the CTR of the site regarding the specific store is not prominent and where CTRs are distributed to a plurality of product sites whose stores are different from each other (Step S102: No), the search device 10 determines that the user is intentionally searching for the product rather than the specific store (Step S105).

In this case, the search device 10 changes the index of the search and sets a second range that does not include the store name as a search target for the search query (Step S106). For example, in a case where the search device 10 has set the second range as the search target, the search device 10 does not use the store name database in the search and excludes the store name from the search target.

Then, the search device 10 searches for the search target, for the search query (Step S107).

6. Modification

An example of the provision processing has been described hereinabove. However, the embodiment is not limited thereto. Hereinafter, a modification of provision processing will be described. Provision processing to be described below may be realized by a function exerted by the terminal device 100 side or may be realized by a function exerted by the search device 10 side.

6-1. Device Configuration

An example in which the search device 10 and the terminal device 100 are included in the information processing system 1 has been described in the above embodiment, but the embodiment is not limited thereto. For example, the search device 10 may be implemented as one function in the terminal device 100 of the user. That is, the search device 10 may be the terminal device 100 of the user. In a case of having such a configuration, in the information processing system 1, the search device 10 and the terminal device 100 are the same device.

6-2. Others

In addition, all or some of the processing described as being automatically performed among the respective processing described in the above embodiment can be manually performed or all or some of the processing described as being manually performed among the respective processing described in the above embodiment can be automatically performed by a known method. In addition, processing procedures, specific names, and information including various data or parameters illustrated in the above document or the drawings can be arbitrarily changed unless otherwise specified. For example, various information illustrated in each drawing is not limited to the illustrated information.

In addition, each component of the illustrated respective devices is a functional concept, and does not necessarily have to be physically configured as illustrated. That is, specific forms of distribution and integration of the respective devices are not limited to those illustrated, and all or some of the respective devices can be configured to be functionally or physically distributed and integrated in arbitrary unit according to various loads, use situations or the like.

In addition, the respective embodiments described above can be appropriately combined with each other as long as processing contents do not contradict each other.

6-3. Program

Figure 6:
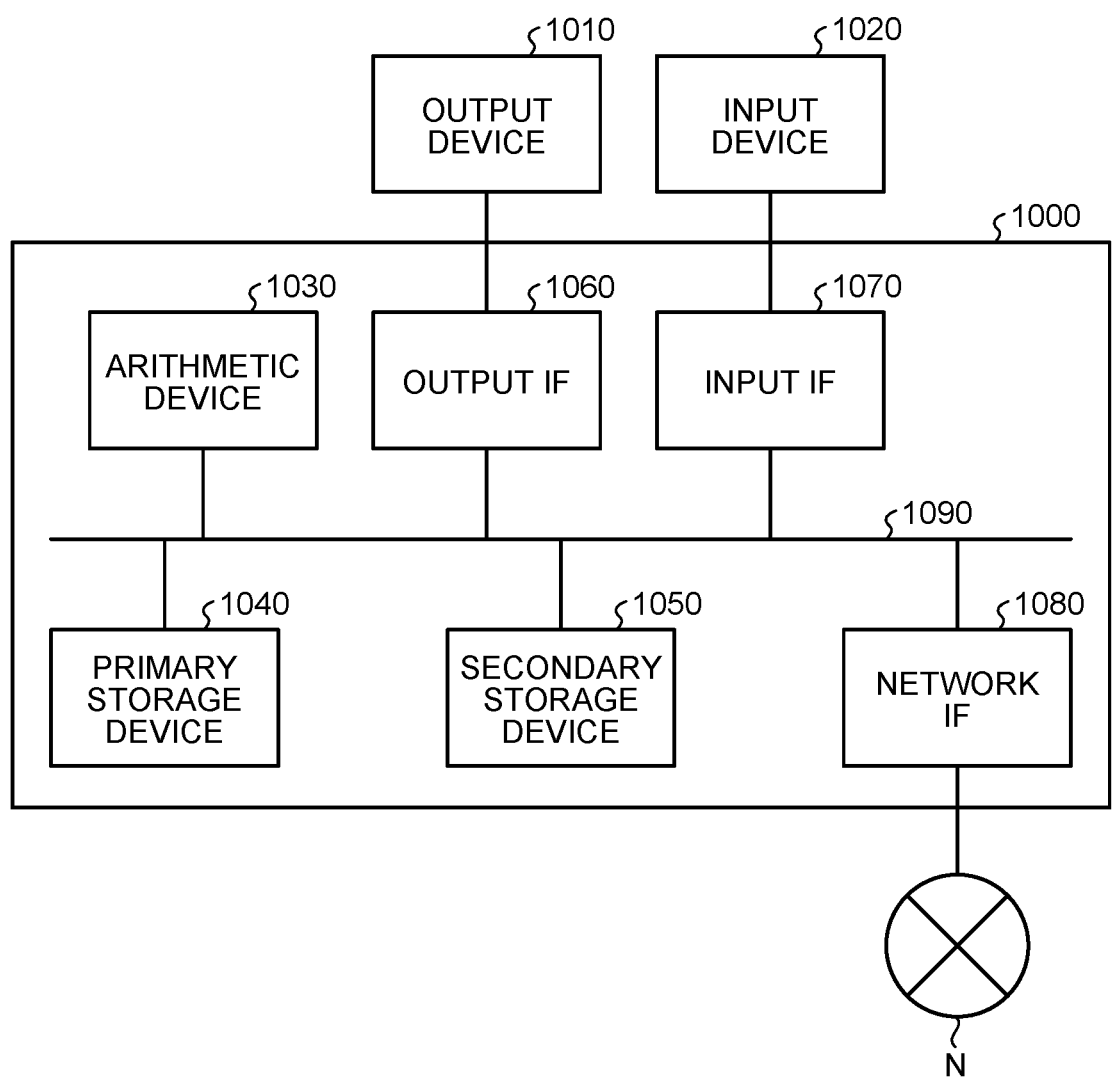
FIG. 6 is a diagram illustrating an example of a hardware configuration.

In addition, the search device 10 and the terminal device 100 according to the embodiment described above is realized by, for example, a computer 1000 having a configuration as illustrated in FIG. 6. FIG. 6 is a diagram illustrating an example of a hardware configuration. The computer 1000 is connected to an output device 1010 and an input device 1020, and has a form in which an arithmetic device 1030, a primary storage device 1040, a secondary storage device 1050, an output interface (IF) 1060, an input IF 1070, and a network IF 1080 are connected to each other by a bus 1090.

The arithmetic device 1030 operates on the basis of a program stored in the primary storage device 1040 or the secondary storage device 1050, a program read from the input device 1020, or the like, and executes various processing. The primary storage device 1040 is a memory device that primarily stores data used by the arithmetic device 1030 for various arithmetic operations, such as a RAM. In addition, the secondary storage device 1050 is a storage device in which data used by the arithmetic device 1030 for various arithmetic operations or various databases are registered, and is realized by, a read only memory (ROM), a flash memory, an HDD, an SSD, or the like.

The output IF 1060 is an interface for transmitting target information to be output to the output device 1010 that outputs various information, such as a monitor and a printer, and is realized by, for example, a connector of a standard such as a universal serial bus (USB), a digital visual interface (DVI), and a high definition multimedia interface (HDMI) (registered trademark). In addition, the input IF 1070 is an interface for receiving information from various input devices 1020 such as a mouse, a keyboard, and a scanner, and is realized by, for example, a USB.

Note that the input device 1020 may be, for example, a device that reads information from an optical recording medium such as a compact disc (CD), a digital versatile disc (DVD), or a phase change rewritable disk (PD), a magneto-optical recording medium such as a magneto-optical disk (MO), a tape medium, a magnetic recording medium, a semiconductor memory, or the like. In addition, the input device 1020 may be an external storage medium such as a USB memory.

The network IF 1080 receives data from another apparatus via the network N and sends the received data to the arithmetic device 1030, and also transmits data generated by the arithmetic device 1030 to another apparatus via the network N.

The arithmetic device 1030 controls the output device 1010 or the input device 1020 via the output IF 1060 or the input IF 1070. For example, the arithmetic device 1030 loads a program from the input device 1020 or the secondary storage device 1050 onto the primary storage device 1040, and executes the loaded program.

For example, in a case where the computer 1000 functions as the terminal device 100, the arithmetic device 1030 of the computer 1000 realizes a function of the control unit 150 by executing the program loaded onto the primary storage device 1040. In addition, in a case where the computer 1000 functions as the search device 10, the arithmetic device 1030 of the computer 1000 realizes a function of the control unit 40 by executing the program loaded onto the primary storage device 1040.

7. Effect

As described above, the search device 10 can provide the information desired by the user. For example, the search device 10 can determine whether the user is intentionally searching for the transaction target or the provider of the transaction target on the basis of the number of clicks, and adjust the search range based on the search query according to a determination result. Specifically, the search device 10 can dynamically change the index used for the search based on the search query according to the determination result. In addition, in a case where the number of clicks of the search result using the first range as the search target are distributed for the search query, the search device 10 can set the second range different from the first range as the search target.

Although some of the embodiments of the present application have been described in detail with reference to the drawings hereinabove, these are examples, and it is possible to carry out the present invention in other embodiments in which various modifications and improvements have been made on the basis of knowledge of those skilled in the art, including aspects described in a section of the disclosure of the present invention.

In addition, the "unit" described above can be replaced with a "means" or a "circuit". For example, the acquisition unit can be replaced with an acquisition means or an acquisition circuit.

According to an aspect of the embodiment, it is possible to provide the information desired by the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
a processor; and
a communication unit connected to a network, wherein
the processor is configured to acquire a search query input by a user from a terminal device of the user via the network;
the processor is configured to select a name of a product or a name of a store as a type of target information to be searched on a basis of a dispersion tendency of numbers of clicks of search results of the acquired search query to optimize a search range;
the processor is configured to search for information corresponding to the selected type of target information to be searched among information corresponding to the acquired search query; and
the processor is configured to provide search results as a response of the acquired search query to the terminal device of the user via the network; and
the processor is configured to set a second range different from a first range as a search target in a case where the numbers of clicks of search results using the first range as a search target are distributed for the acquired search query to optimize a search range on the basis of a dispersion tendency of the numbers of clicks of the search results,
wherein the first range comprises store name information, product name information, product attribute information, and brand information, and the second range comprises product name information, product attribute information, and brand information.

2. The information processing device according to claim 1, wherein the processor is configured to select a name of a transaction target or that other than the name of the transaction target as the type of target information to be searched.

3. The information processing device according to claim 2,
wherein the processor is configured to select a name of a provider of the transaction target as that other than the name of the transaction target.

4. The is processing device according to claim 1,
wherein the processor is configured to dynamically change an index used for a search based on the acquired search query to an index corresponding to the selected type of target information to be searched.

5. The information processing device according to claim 1, further comprising
the processor is configured to determine whether the user is intentionally searching for the transaction target or the provider of the transaction target on a basis of the number of clicks when the processor has searched for the information corresponding to the acquired search query,
wherein the processor is configured to select the type of target information to be searched according to a determined result.

6. The information processing device according to claim 5,
wherein the processor is configured to determine that the user is intentionally searching for the provider in a case where the number of clicks regarding the provider is prominent on a site.

7. The information processing device according to claim 5,
wherein the processor is configured to determine that the user is intentionally searching for the transaction target in a case where the numbers of clicks are distributed to a plurality of sites regarding the transaction targets Whose providers are different from each other.

8. The information processing device according to claim 5,
wherein the processor is configured to determine that the user is intentionally searching for the provider in a case where an overlapping rate of words between the acquired search query and the name of the provider is a predetermined threshold value or more, on the basis of a search history.

9. The information processing device according to claim 5,
wherein the processor is configured to determine that a word matching at least a part of the name of the provider is included in the acquired search query in a case where the processor has determined that the user is intentionally searching for the provider.

10. The information processing device according to claim 5,
wherein the processor is configured to determine that a word matching at least a part of the name of the provider is not included in the acquired search query in a ease where the processor has determined that the user is intentionally searching for the transaction target.

11. The information processing device according to claim 5,
wherein the processor is configured to determine whether the user is intentionally searching for the transaction target or the provider on a basis of a click through rate indicating a ratio of the number of clicks to the number of impressions.

12. An information processing method executed by an information processing device as a computer, the information processing method comprising:
an acquisition process of acquiring a search query input by a user from a terminal device of the user via a network;
a selection process of selecting a name of a product or a name of a store as a type of target information to be searched on a basis of a dispersion tendency of numbers of clicks of search results of the acquired search query;
a search process of searching, for information corresponding to the selected type of target information to be searched among information corresponding to the acquired search query to optimize a search range;
a provision process of providing search results as a response of the acquired search query to the terminal device of the user via the network; and
a setting process of setting a second range different from a first range as a search target in a case where the numbers of clicks of search results using the first range as a search target are distributed for the acquired search query to optimize a search range on the basis of a dispersion tendency of the numbers of clicks of the search results,
wherein the first range comprises store name information, product name information, product attribute information, and brand information, and the second range comprises product name information, product attribute information, and brand information.

13. A non-transitory computer readable storage medium storing a program for causing a computer to execute the following procedures of:
an acquisition procedure of acquiring a search query input by a user from a terminal device of the user via a;
a selection procedure of selecting a name of a product or a name of a store as a type of target information to be searched on a basis of a dispersion tendency of numbers of clicks of search results of the acquired search query to optimize a search range;
a search procedure of searching for information corresponding to the selected type of target in to be searched among information corresponding to the acquired search query;
a provision procedure of providing search results as a response of the acquired search query to the terminal device of the user via the network; and
a set procedure of setting a second range different from a first range as a search target in a case where the numbers of clicks of search results using the first range as a search target are distributed for the acquired search query to optimize a search range on the basis of a dispersion tendency of the numbers of clicks of the search results,
wherein the first range comprises store name information, product name information, product attribute information, and brand information, and the second range comprises product name information, product attribute information, and brand information.

* * * * *